March 27, 1934.　　C. S. PATTON ET AL　　1,952,217
METHOD OF MAKING PIPE
Filed Oct. 31, 1931　　2 Sheets-Sheet 2
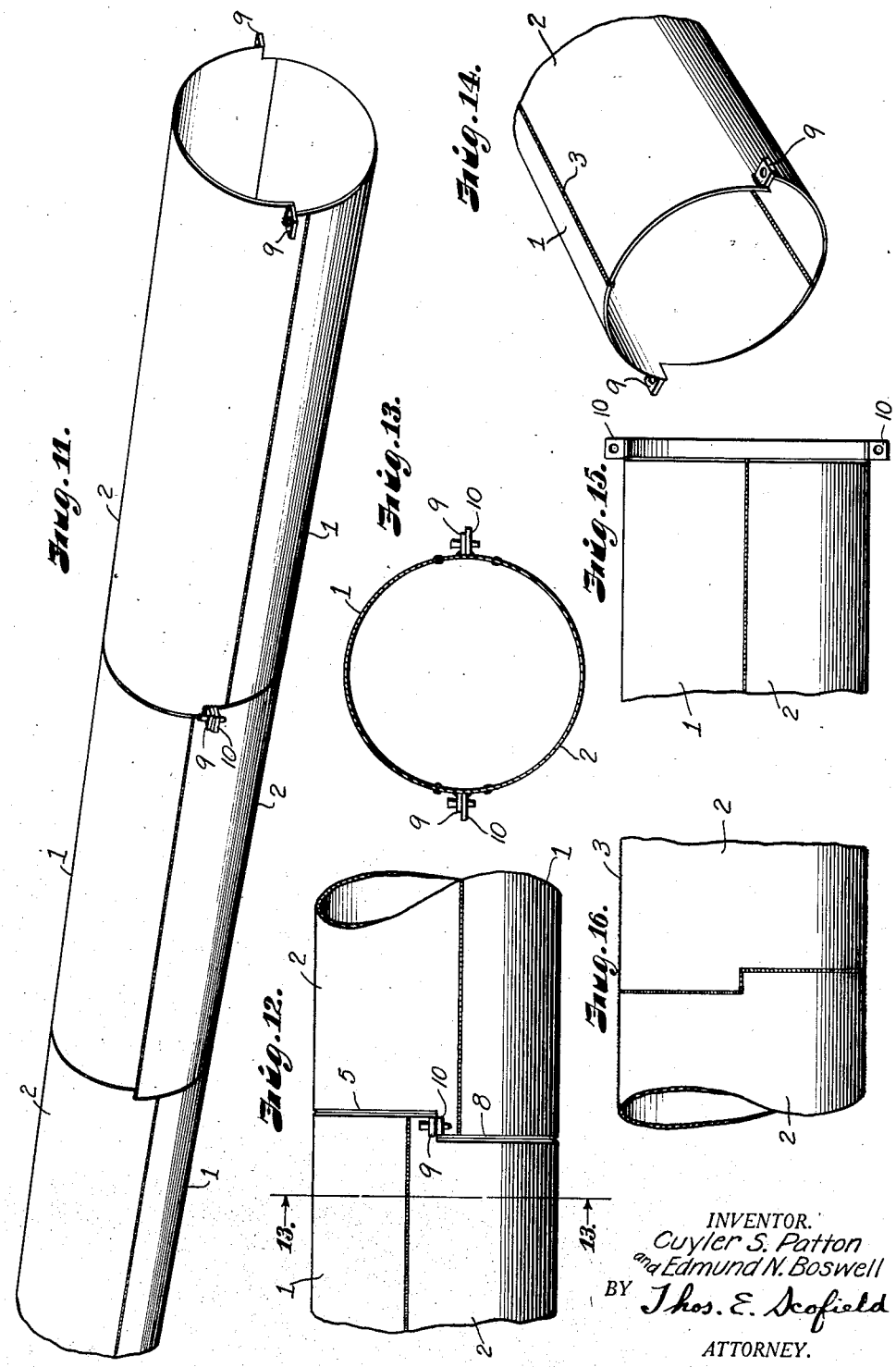
INVENTOR.
Cuyler S. Patton
and Edmund N. Boswell
BY Thos. E. Scofield
ATTORNEY.

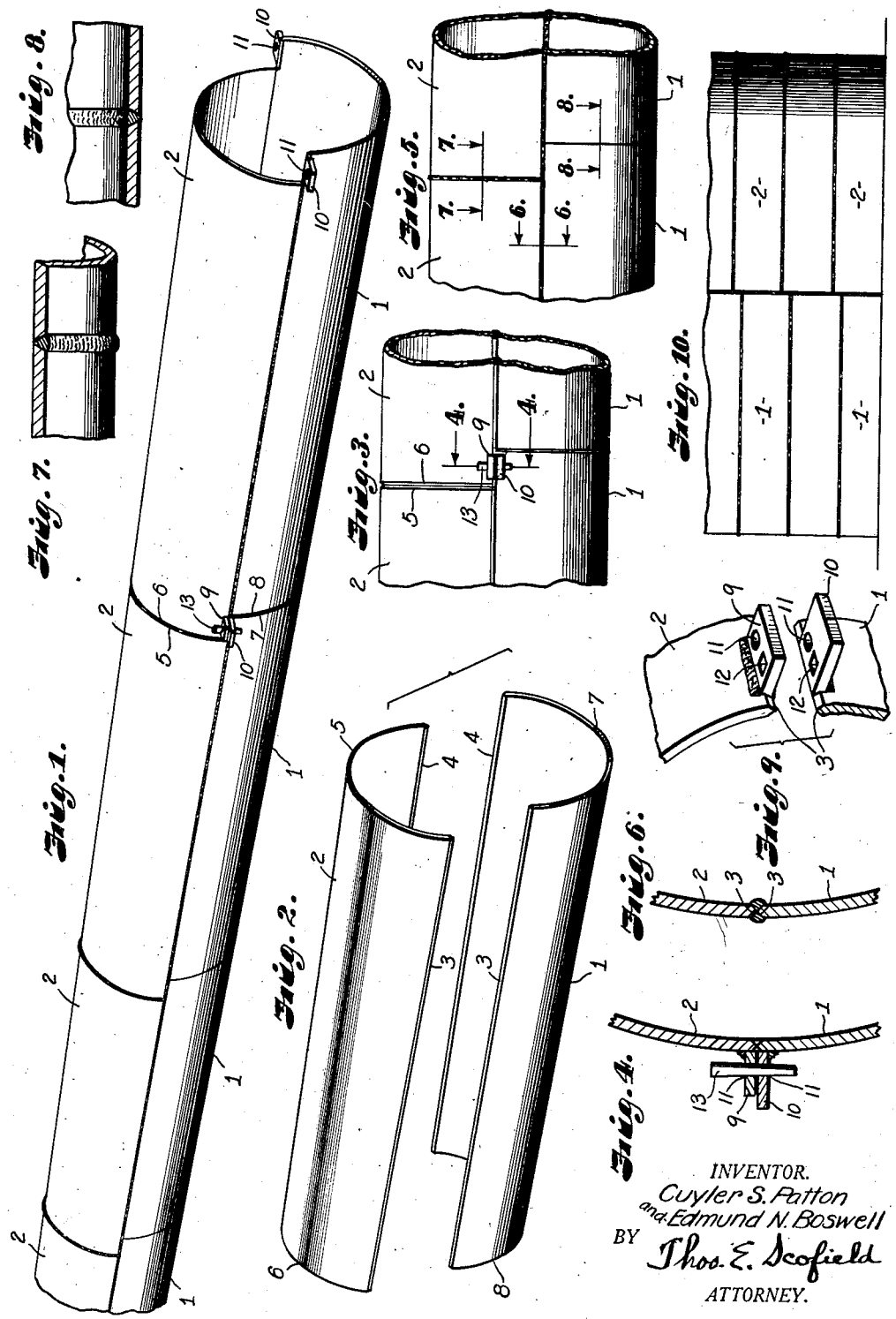

Patented Mar. 27, 1934

1,952,217

UNITED STATES PATENT OFFICE 1,952,217

METHOD OF MAKING PIPE

Cuyler S. Patton and Edmund N. Boswell, New York, N. Y., assignors to Alco Products, Incorporated, New York, N. Y., a corporation of Delaware Application October 31, 1931, Serial No. 572,327

3 Claims. (Cl. 113—33)

Our invention relates to pipes or vessels having a cylindrical cross section and a method of making the same, with special reference to an improved joint between the individual sections forming the pipe or cylindrical vessel.

Our invention is particularly applicable for joining large diameter circular pipes in situ for water supply or other purposes.

The practice at present in joining pipe sections is to employ riveted joints, flanged joints or welded joints. In a riveted joint, the sections are usually lapped, the ends having been punched to take rivets, bolted into position, riveted and then caulked for tightness. Modifications of this type of joint contemplate the use of a butt strap positioned either on the outside or the inside or in some cases on both sides. When a butt strap is used, the ends of the pipe sections abut each other. In making a welded joint under the present practice, the ends of the two joining sections are abutted and welded around the periphery, either inside or outside or on both sides. A modification of this type of joint is sometimes resorted to wherein two joining pipe sections are lapped and welded, both inside and out.

Flanges or various coupling means are frequently employed, which make use of bolts or rivets.

The type of welded joint now used gives a continuous circumferential seam which must take up heavy residual stresses. When a lapped joint is used, the ends must be belled in order to form the joint, or large and small course must be employed in order that one section will fit into its joining section. When riveted joints are used, punching or drilling of the rivet holes must be resorted to in the shop. Furthermore, caulking is necessary. With the welded joints now in use, heavy residual stresses are locked in the weld and at least one half of the diameter of the joint must be welded with overhead welding, or the pipe must be rotated.

Another object of our invention is to provide a novel pipe joint and a method of making the same.

A still further object of our invention is to provide a welded joint in which overhead welding is eliminated.

Other objects will appear from the following description:

Figure 1 shows a pipe made in accordance with our invention.

Figure 2 shows a method of placing the plates from which an individual pipe section is made preparatory to welding.

Figure 3 shows our improved joint between two adjoining sections prior to welding.

Figure 4 is a section along line 4—4 taken on Figure 3.

Figure 5 is a view of our joint subsequent to welding.

Figure 6 is a section taken on line 6—6 of Figure 5 showing the longitudinal weld.

Figure 7 is a section taken on line 7—7 of Figure 5.

Figure 8 is a section taken on line 8—8 of Figure 5.

Figure 9 is a detail view showing the clips on two adjoining sections which are used in placing the sections in position for making the joint.

Figure 10 is a view of a cylindrical tank made in accordance with our invention.

Figure 11 shows a pipe made in accordance with another embodiment of our invention.

Figure 12 shows a joint made in accordance with the embodiment of Figure 11 before welding.

Figure 13 shows a section taken on Figure 12 along the line 13—13.

Figure 14 shows the view of the end of a section made in accordance with a different embodiment of our invention.

Figure 15 is another view of the modification shown in Figure 14.

Figure 16 is a view of a joint made in accordance with the embodiment shown in Figures 14 and 15.

In general, our invention contemplates the manufacture of individual sections formed of two semicircular plates or of two plates bent to semicircular form. These plates may be of equal length and are offset with respect to one another along the longitudinal axis so that the resulting section formed by the joining of the two plates will have projecting semicircular ends. It will be appreciated that, since the amount of offset is identical for each section, that the ends of the sections will be complementary to each other. To make the joint, one section is abutted against the adjoining section. Temporary clips are fitted to the lower projecting portion of one section and the upper projecting part of the other section. These clips are provided with suitable openings so that the sections may be aligned and held in proper position for welding by the use of tapered pins or bolts through the openings in the clips. The ends of the sections are suitably machined or planed so that they are ready for welding when placed in position and held by the clips.

According to another embodiment of our invention, we may obtain the offset or stepped end by using plates of unequal length to form our pipe sections and suitably notching the pipe section plates to form interfitting ends. Similarly we may cut steps in each plate in such a manner as to dispose the stepped portion 90 degrees from the longitudinal seam. This last modification of our invention has the additional advantage of staggering both the longitudinal and the traverse seams.

When the sections have been secured in welding position by the clips, the two adjoining lower portions of each section are welded by an inside weld. The two upper portions of each section are welded by an outside weld. This procedure may be carried on simultaneously and eliminates the necessity of overhead welding. Then the clips are removed, it being noted that these clips are made of different sizes in order to facilitate their removal and the longitudinal seam completed in the vicinity of the clips by welding both inside and outside. The same procedure is followed for each successive section.

More particularly referring now to the drawings, plate 1 and plate 2 are formed from sheets of steel, their edges having been beveled to the proper angle. Both sheets 1 and 2 are of exactly the same length. While we prefer to use sheet steel bent to semicircular form, it is obvious that preformed semicircular members may be used in carrying out our invention. The sheets are placed in offset relation to each other as shown in Figure 2 and welded along the beveled edges 3 and 4, both inside and outside, as shown in Figure 6. The edges 5 and 6 of the upper sheet 2 are beveled for an outside weld. The edges 7 and 8 of the lower sheet 1 are beveled for the inside weld. It is to be understood that, while we prefer to use an inside weld for the lower portion of our joint and an outside weld for the upper portion of our joint, that we do not wish to be limited to this type of weld inasmuch as our invention may be practiced with an inside weld or an outside weld or a combined weld throughout. Each section is made in the same manner. Two sections are then placed in proper position for welding and held in this position by any suitable arrangement. When in aligned position, clips 9 and 10, shown clearly in Figure 9 are welded temporarily to the two adjoining sections, clip 9 being welded to the projecting portion of the upper sheet and clip 10 being welded to the projecting portion of the lower sheet. It is to be noted that clip 10 is longer than clip 9 in order to facilitate its removal when the function of the clips has been completed. The clips 9 and 10 are provided with an aligned opening or openings 11 and 12, which may be of any suitable cross section. As many openings as are necessary may be used, depending upon the weight of the individual sections. The sections are now ready for transportation to the site in which the pipe is to be used.

In assembling a length of pipe from a plurality of our sections the procedure is simple. One section is aligned with its neighbor by means of the clips through holes of which are driven tapered pins 13 as shown in Figures 3 and 4. If desired, bolts or any other suitable securing means may be used. The sections are now in the position shown in Figure 3. An inside weld is now made between the adjoining lower portions 2 and an outside weld is made between the two adjoining upper portions 3. These welding operations may be carried on simultaneously in order to save time, if desired. By resorting to the use of an inside weld in the lower section and an outside weld in the upper section, the necessity of overhead welding is dispensed with. It is obvious that any suitable type of weld may be used to join sections, however. When the semicircular portions of the weld have been completed, the clips 9 and 10 are removed. The small longitudinal portion which runs the length of the overhang is then welded both inside and out to complete the longitudinal seam. Figure 5 shows the completed joint. This procedure is repeated for each successive section of pipe added. The terminal of the pipe may be completed in any desired manner. The overhanging portion may be cut off to present a circular portion to which may be secured the usual fittings in the customary manner. A short end section may be provided, having a flange at one end and an overhang at the other end to fit the last section of the pipe.

It is obvious that our invention is applicable for the construction of cylindrical vessels of any nature, such as a cylindrical tank shown in Figure 10.

It will be seen that we have accomplished the objects of our invention. The practice of our method eliminates the use of a continuous circumferential seam present in an ordinary welded joint and the heavy residual stresses which are usually present in such welds. These residual stresses are eliminated by the offset portion which permits them to be carried by the longitudinal portion of the overhang. The necessity for annealing is dispensed with. The use of additional material which is required for a lap seam is not necessary with our type of joint. The necessity for caulking is obviated and it is apparent that the laying of the pipe can be conducted expeditiously and with a great saving of time and labor so that the installation costs are materially reduced. The resulting pipe is more homogeneous and considerably stronger than any of the present pipes now available.

In the modification shown in Figure 11, plates 1 and 2 are of unequal width and the wide plate 2 is notched in each instance to form an interfitting joint as shown in Figure 12 so that in addition to having the traverse seams 5 and 8 staggered the longitudinal seams are also staggered as clearly shown in Figure 12.

In the modification shown in Figures 14, 15, and 16, each plate is set so that when two plates are used to form a pipe section, they will appear as shown in Figure 14. The step, it will be noticed, is displaced 90 degrees from the longitudinal seam.

It is to be understood that certain features, sub-combinations and operations are of utility and may be employed without reference to other features and sub-combinations. This is contemplated by and is within the scope of our claims. It is further obvious that various changes may be made in details within the scope of our claims, without departing from the spirit of our invention. It is, therefore, to be understood that our invention is not to be limited to the specific details shown and described.

Having thus described our invention, what we claim is:

1. The method of joining pipe sections having complementary, interfitting stepped ends, including the steps of placing said sections in welding position, securing said sections in said welding position, welding one pair of adjoining sections with an inside weld, welding the second pair of adjoining sections with an outside weld, removing said securing means and completing the longitudinal seams in the vicinity of the stepped portions by welding.

2. The method of laying pipe in situ which includes the steps of forming pipe sections having interfitting stepped ends, securing aligning means to said stepped end portions, aligning respective sections in welding position with the stepped ends interfitting, welding the semicircular portions of stepped ends, removing the aligning means and welding the longitudinal portions of the stepped ends, said aligning, welding and removing operations being carried on in situ.

3. The method of joining pipe sections having complementary, interfitting, stepped ends including the steps of placing said sections in alignment with the stepped ends interfitting, securing said sections in aligned interfitting position by securing means, welding the seam thus formed except in the vicinity of said securing means, removing said securing means and completing the seam by welding.

CUYLER S. PATTON.
EDMUND N. BOSWELL.